UNITED STATES PATENT OFFICE 2,791,567

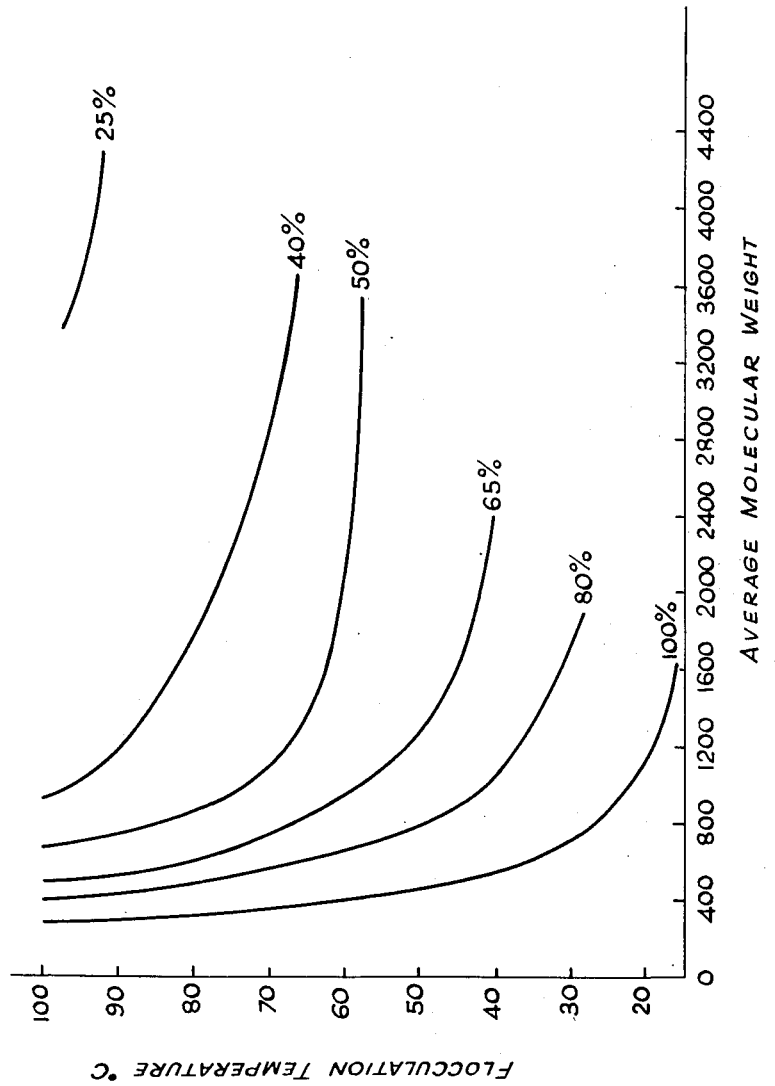

RUBBER LATEX COMPOSITIONS AND THE MANUFACTURE OF ARTICLES THEREFROM

Arnold John Lowe, Manchester, Donald Butler, Moston, Manchester, and Ernest Gordon Cockbain, Welwyn Garden City, England, assignors, by mesne assignments, to Shell Development Company, New York, N. Y., a corporation of Delaware Application April 23, 1953, Serial No. 350,662

Claims priority, application Great Britain April 25, 1952

9 Claims. (Cl. 260—5)

This invention relates to rubber latex compositions and to the manufacture of rubber articles therefrom.

In the manufacture of rubber articles from latex compositions the shape of the article may be obtained by immersing a suitably shaped former in the latex composition in the so-called dipping process, or by filling a suitably shaped mould with the latex composition as, for example in the manufacture of sponge rubber articles. The shaped latex is converted into a gel or coagulum prior to such steps as drying or vulcanisation.

There are a number of known methods of coagulating or gelling latex compositions. Thus in the manufacture of articles by the dipping process, one well-known method is to coat the outer surface of the former with a chemical compound, e. g. calcium chloride, having the property of coagulating the latex composition. Another known method used in the dipping process is to add to the latex composition a heat-sensitising agent, namely polyvinyl methyl ether, which causes the composition to coagulate at an elevated temperature. In the latter method most of the free ammonia present is neutralized. The dipping of a heated former into the heat-sensitised latex composition maintained at room temperature results in the deposition of a film of rubber on the former. The use of the heat-sensitising method enables thick deposits to be built up more rapidly than if coagulant-coated formers are used and also avoids the danger of destabilising the latex bath by diffusion of coagulant from the former. However, in the manufacture of dipped goods it is often necessary for the latex bath to remain stable for long periods, e. g. for several weeks, and in such cases, it has been found advisable to add a stabilising agent to latex compositions rendered heat-sensitive as described above, even though the heat-sensitivity of the latex may be reduced thereby.

In the manufacture of sponge rubber articles in which a mould is employed for shaping the articles, coagulation or gelling has hitherto been effected by a gelling agent which may be sodium silicofluoride or the corresponding potassium or barium salt and which is added as a suspension in water to the foamed latex composition prior to pouring the foamed material into the mould. The action of these known gelling agents is rapid and hence it is customary to add them after the compounded latex has been whipped into a foam so that more time may be available for manipulating the fluid latex composition. Even so the time available for shaping is strictly limited.

The present invention consists in a rubber latex composition containing as a heat-sensitising agent, a polyoxyalkylene compound having at least four oxy-1,2-propylene units in the molecule and having an average molecular weight of from 350 to 5,000 and being soluble to the extent of at least 5% by weight in water at 20° C.

The terms "oxypropylene" and "propylene oxide" where used in this specification refer in usual manner to the 1,2-propylene compounds and units derived therefrom forming the radical —OC$_2$H$_3$(CH$_3$)—.

The heat-sensitising agent present in the latex composition of the invention may most suitably be a polyoxyalkylene compound having the general formula:

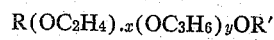

where:

R and R' are similar or dissimilar and are selected from H and alkyl, aryl, alkaryl, aralkyl, alkenyl and acyl radicals containing up to 18 carbon atoms,
y is not less than 4, and
x may be zero, the formula indicating the number of oxyalkylene units in the molecule but not necessarily their sequence relatively to one another.

The heat-sensitising agent may be a polyoxyalkylene compound having a formula similar to that given above, but containing within the oxyalkylene chain an organic residue or diradical of the structure —OR″— formed from a di-hydroxy compound of the general formula HOR″OH, where R is a hydrocarbon radical containing from 4 to 18 carbon atoms, e. g. the diradical formed from 2,4-hexanediol, 1,8-octanediol or 1,3-dihydroxy benzene.

Further, polyoxyalkylene compounds of the kind referred to in the two preceding paragraphs but having one of the oxygen atoms replaced by a sulphur atom may also be used as heat-sensitising agents in the invention.

The amount of heat-sensitising agent present in the compositions of the invention may vary from about 1% to 10%, and is preferably from 2 to 5%, by weight of the dry rubber content of the composition.

The rubber latex used in the compositions of the invention may be a natural rubber latex, but preferably concentrated to 55 to 65% by weight dry rubber content or a mixture of natural rubber latex with a lesser amount of synthetic rubber latex such as that produced by the emulsion polymerisation of a mixture of butadiene-1:3 and styrene and known commercially as GR–S latex, the mixture preferably containing from 50 to 60% by weight of dry rubber (natural+synthetic). The latex may be used in the pre-vulcanised condition, or compounding ingredients may be added to enable vulcanisation to be carried out subsequent to gelation of the latex.

The usual, commercially available natural rubber latices are ammonia-preserved and have a pH value in the region of 10. The compositions of the invention prepared from such latices will have a similar pH value and when this is the case, the compositions should also contain zinc oxide or a similarly acting metal oxide, e. g. magnesium oxide, which assists the heat sensitisation. Zinc oxide is also normally added as a vulcanisation activator and will serve both purposes when vulcanisable compositions are used. When prevulcanised compositions are used zinc oxide may have to be added if the excess, which has been left after vulcanisation, proves insufficient.

If the composition is rendered substantially neutral, i. e. if its pH value is between 6 and 8, then a non-ionic stabilising agent such as cetyl/oleyl alcohol combined with from 15 to 20 molecules of ethylene oxide should also be present in addition to the heat sensitising agent. In the latter case, the presence of zinc oxide or other metal oxide is unnecessary, though zinc oxide may still be present as a vulcanisation activator in non-vulcanised compositions and the excess zinc oxide will usually be present in prevulcanised compositions.

The heat-sensitising agents used in the latex compositions of the invention have a solubility in water which decreases as the temperature is raised and should have a flocculation temperature of between 25° C. and 80° C. When used for the production of articles by the dipping process the heat-sensitising agent should preferably have a flocculation temperature of between 35 and 55° C. When used for the bulk coagulation of rubber in moulds either in a batch or a continuous process its flocculation temperature should preferably be between 25 and 40° C.

The term "flocculation temperature" of a compound as used in the present specification is the minimum temperature at which a 5% by weight solution of the compound in water renders standard news type illegible when viewed in normal daylight through a one inch depth of the solution.

The flocculation temperature of the heat-sensitiser is an indication of the temperature at which a latex composition in which it is incorporated will remain stable without coagulation for any appreciable length of time. Thus to keep the latex compositions of the invention stable they must be maintained at a temperature below the flocculation temperature of the heat-sensitising agent used.

The known heat-sensitising agent polyvinyl methyl ether, which has previously been used in the dipping process, has a flocculation temperature of about 30 to 35° C. which may be inconveniently low in certain circumstances, for example, when high atmospheric temperatures are prevalent. Furthermore, it is difficult to handle as it forms a viscous solution and products resulting from its use have a low wet strength.

The heat-sensitising agents used in the compositions of the invention can be made of the desired flocculation temperature and solubility without difficulty as will be more fully explained hereinafter and can easily be handled in aqueous solution. They can also be used in smaller quantities than those recommended for polyvinyl methyl ether and furthermore no neutralisation of the ammonia present is necessary when the latex composition contains zinc oxide or other similarly acting metal oxide.

Latex compositions in accordance with the invention may be used with advantage for the production of rubber articles both by the dipping process and by the moulding process.

The invention also consists in a process for the manufacture of rubber articles in which a latex composition containing a heat-sensitising agent in accordance with the invention is shaped, either by dipping or moulding, and the shaped composition is converted to a gel by heating to a temperature not less than the flocculation temperature of the heat-sensitising agent.

By selection of a heat-sensitiser having a suitable flocculation temperature the use of stabilisers in the dipping process may be avoided when using a composition of the invention having a pH value in the region of 10 and containing zinc oxide or an equivalent metal oxide, even when the latex bath is in continuous use for several weeks with constant replenishing of the latex composition. Furthermore, the heat-sensitisers of suitable flocculation temperature may be added to the latex composition to be used in the production of sponge rubber articles prior to foaming the composition since gelling does not occur until the foam is heated. The process of the invention is accordingly much more flexible in operation than the known processes.

In one method of carrying out the process of the present invention for the manufacture of rubber articles by the dipping technique, a vulcanisable latex composition having a pH value of about 10 is prepared containing a heat-sensitising agent in accordance with the invention. The ingredients of the vulcanisable latex composition will normally include sulpur, a vulcanisation accelerator and from 1 to 2% of zinc oxide calculated on the weight of dry rubber content. With this amount of zinc oxide already present, no further zinc oxide need be added, but the amount of zinc oxide in the vulcanisable latex composition should never be allowed to fall below 0.5% by weight otherwise a marked decrease in the heat-sensitivity of the latex composition is liable to occur. The optimum proportion of zinc oxide depends on the composition of the latex composition, its pH, the conditions under which vulcanisation is to be carried out and upon the thickness of deposit required. The optimum proportion of zinc oxide will normally be between 1.0 to 2.0%, calculated on the weight of dry rubber content when the pH of the latex composition is in the range 9.5 to 10.5 and the dry rubber content is in the range 55% to 65% calculated on the total weight of the latex composition. A former of suitable shape and heated to the required temperature is immersed in the latex composition for a time sufficient for a deposit of the required thickness to be produced, after which the former is withdrawn and the deposit dried and vulcanised. An immersion time of about 10 seconds, giving a coating of from 0.015 to 0.030 inch, is quite normal. If a prevulcanised latex composition is used, instead of the vulcanisable latex composition, no additional vulcanising ingredients will normally be added, except for zinc oxide which again should be present in an amount preferably not less than 0.5% calculated on the weight of the dry rubber content.

In another method which may be used for the manufacture of articles by the dipping process, a prevulcanised latex which has been freed from any excess of zinc oxide or other metal oxide present and has had its pH value reduced to between 6.5 and 8.0 is prepared containing a non-ionic stabilising agent, such as cetyl/oleyl alcohol combined with from 15 to 20 molecules of ethylene oxide, and a heat sensitising agent in accordance with the invention. A heated former is immersed in the composition for a time sufficient for a deposit of the required thickness to be produced, after which the former is withdrawn and the deposit dried. The latex may be freed of the metal oxide by centrifuging and its pH value may be reduced by the addition whilst stirring of formaldehyde or dilute hydrochloric acid. The stabiliser is added to the latex prior to or, preferably, together with the heat sensitising agent as a concentrated aqueous solution. The non-ionic stabiliser may be present in an amount of from 0.4 to 0.9%, and preferably 0.7%, by weight of the dry rubber content of the composition.

In carrying out the process of the present invention for the manufacture of sponge rubber articles it is preferred to use a composition of the normal pH, i. e. about 10, containing zinc oxide and no stabilising agent. In this method one may proceed as follows. The heat-sensitised latex composition, having a pH value in the region of 10, is converted into a foam of desired volume using, for example, a wire-cage beater. Preferably a foaming agent is also incorporated into the latex composition. The foaming agent may be the ammonium or potassium salt of ricinoleic acid, present in an amount between 0.1% and 0.5% on the weight of dry rubber. Alternatively, from 0.1 to 0.4% of a mono-octyl-phenyl ether of an octaoxyethylene diol may be used as foaming agent. After beating the composition into a foam in the manner described above, the remainder of the compounding ingredients, including the vulcanising ingredients, are then added and the compounded foam is poured into a mould of suitable shape. Gelling and vulcanisation of the foam is then carried out in a single operation either continuously or batchwise, preferably by heating the mould and its contents at 100° C. for a sufficient period of time to produce a satisfactory state of vulcanisation, usually between 30 and 45 minutes. The vulcanised compound is then washed with water and the excess water removed, if desired, by hydro-extraction, the product being finally dried in air at about 40 C. Once again the zinc oxide content should normally be between 1 and 2% calculated on the weight of dry rubber content.

Consideration will now be given to the factors governing the choice and preparation of polyoxyalkylene heat-sensitising agents for use in the present invention.

The flocculation temperature of the heat-sensitising agent may be regarded as the cloud point of a 5% solution of the agent in water. A solution containing 2.5% by weight of the heat-sensitising agent will have a higher cloud point than a 10% by weight solution. Economically it is desirable to use as small an amount of sensitising agent as possible, and it is preferred to use not more than about 2.5% by weight based on the dry rubber content of the latex composition. In the preparation and use of an industrial latex bath variations in the sensitising agent concentration are liable to occur, so that it is desirable that the cloud point should not differ materially, i. e. by more than about 5° C., from the defined flocculation temperature as the sensitising agent concentration in water varies between 3% and 7%. It has been found that the variation of cloud point with concentration becomes less pronounced in the case of the polyoxyalkylene compounds of the general formula given above as the molecular weight is increased and that such compounds having a molecular weight of from 900 to 3000 are satisfactory in this respect.

Compounds having the desired molecular weight and flocculation temperature may be obtained by adjusting the proportions of oxyethylene and oxypropylene contents in the molecule. Thus by increasing the proportions of oxyethylene groups to oxypropylene groups a compound of increased molecular weight can be formed to give a specified flocculation temperature. The flocculation temperature appears to be substantially independent of the structure within a compound of given composition.

Particularly satisfactory results and ease of working may be obtained using polyoxyalkylene diols as heat-sensitising agents, i. e. compounds of the general formula given above in which both R and R' are H.

The attached drawing shows graphically the relationship between flocculation temperature and molecular weight for a number of such diols in which from 25 to 100% by weight of the oxyalkylene groups are oxypropylene groups. The percentage figure at the end of each curve is the percentage by weight of the oxypropylene content based on the total oxyalkylene content of the diol to which the curve relates. It has already been stated that the flocculation temperature should preferably be within the range 35 to 55° C. for the dipping process, and it can be seen from the drawing that for the polyoxyalkylene diol to have a flocculation temperature within this preferred range and to have also a molecular weight within the preferred limits of 1000–3000, the content of oxypropylene groups in the diol should be from 50 to 80% by weight of the total content of oxyalkylene groups.

The flocculation temperature of any diol may be reduced by blocking one or both of its ends by an alkyl, aryl, alkaryl, aralkyl, alkenyl or acyl group. The degree of the reduction depends on the molecular weight of the polyoxyalkylene diol, and more particularly on the molecular weight of the blocking group or groups. Thus when one end H of a diol is replaced by a group containing from 1 to 4 carbon atoms, e. g. $CH_3$, $C_4H_9$ or $CH_3CO$, this results in a reduction of 5–10° C. in the flocculation temperature. When the end H is replaced by a larger group, e. g. octylphenyl or oleyl, the reduction may be over 100° C. The additional blocking of the other end of the diol is accompanied by a similar further reduction in flocculation temperature together with a reduction in solubility in water at 20° C. For these reasons it is preferred that in the general formula given above R should be H or an alkyl group containing not more than 4 carbon atoms and that R' should be H.

The above factors of composition and structure control the flocculation temperature of the heat-sensitising agent, but for the sensitising agent to be industrially useful it must be economical and easy to use and must produce rubber articles with desirable properties. The heat-sensitising agent is most easily handled as a 20–50% solution in water, so that it should desirably be soluble in water to this extent, otherwise handling difficulties are encountered and the latex composition becomes diluted unduly with water. Polyoxyalkylene diols containing over 80% by weight of oxypropylene groups have in general poor solubility characteristics. Materials with both ends blocked have also poorer solubility characteristics than similar but unblocked compounds. For this reason therefore it is preferred to use polyoxyalkylene diols or their simple mono alkyl ethers (the alkyl radical containing up to 4 carbon atoms) containing not more than 80% by weight of oxypropylene groups.

It is desirable that the heat-sensitising agent should have a long bath life when mixed with aqueous rubber latex stabilised with ammonia.

This alkaline medium causes hydrolysis of acylated sensitising agents, so that unless the sensitised latex composition is to be used immediately it is preferred not to use acylated compounds.

Whereas sensitising agents of the desired flocculation temperature containing 5 to 10% by weight of oxypropylene groups can be prepared by suitably blocking the ends of polyoxyalkylene diols, such sensitising agents are not so desirable as those containing a higher proportion of oxypropylene groups in that they lead to rubber films having little or no wet strength.

Broadly speaking, therefore, the preferred heat-sensitising agent used in the invention, particularly when the compositions are to be used for the manufacture of articles by the dipping process, is a polyoxyethylene-oxypropylene diol having a flocculation temperature of from 35° C. to 55° C., a molecular weight of between 1000 and 2000 and an oxypropylene content of from 50 to 80% by weight, or is a lower alkyl (up to 4C), vinyl or allyl mono-ether of a polyoxyethyleneoxypropylene diol having a flocculation temperature of from 35 to 55° C., a molecular weight of between 500 and 2000 and having an oxypropylene content of from 40 to 80% by weight.

For the manufacture of sponge rubber articles wherein great bath stability is not required the heat-sensitising agent used may satisfactorily be a polyoxypropylene diol having a flocculation temperature of from 25 to 40° C. and a molecular weight of from 400 to 1000.

The polyoxyalkylene heat-sensitising agents for use in the present invention can be prepared by several known methods all of which involve the reaction of propylene oxide or ethylene oxide, or mixtures of the two, with a suitable hydroxy compound in the presence of a catalyst, usually an alkali metal catalyst. The hydroxy compound may be an alcohol, phenol, oxy- or polyoxy-propylene diol, oxy- or polyoxy-ethylene diol, polyoxyethyleneoxypropylene diol, or mono-alkyl or mono-aryl ethers of these diols. In the case where the alkylene oxide is only ethylene oxide, the hydroxy compound should be an oxy- or polyoxy-propylene diol, or polyoxyethyleneoxypropylene diol, or a mono-alkyl or mono-aryl ether of such diols.

Such processes inevitably lead to complex mixtures having an average molecular weight slightly less than that predicted from the reactants. It is well known that in addition to wide variation in chain length around the mean, the distribution of individual oxypropylene and oxyethylene groups in a polyoxypropyleneoxyethylene diol chain of known average composition may vary considerably. Such variations are described in United States Patent No. 2,425,845 in which diethylene glycol, for example, is reacted in a batch process with mixtures of propylene oxide and ethylene oxide, and in United States Patent No. 2,425,755 in which the butanol is reacted in like manner. It has been found that materials possessing suitable flocculation temperatures and of suitable solubilities produced by these processes are useful heat-sensitising agents. Thus the polyoxyethyleneoxypropylene compounds marketed by Carbide and Carbon Chemicals Corporation as "Ucon" lubricants of the H. B. series have been found to be useful heat-sensitising agents. They are believed to be monobutyl ethers of polyoxyethyleneoxypropylene diols containing approximately equal weights of oxyethylene and oxypropylene groups, and have average molecular weights of from 500 to 3000.

Suitable polyoxyethyleneoxypropylene diols, or their mono-alkyl or mono-aryl ethers, for use as heat-sensitising agents in the invention may be prepared by continuously passing a mixture of ethylene oxide and propylene oxide in homogeneous admixture with the appropriate organic hydroxy compound through a reactor maintained at a temperature between 50 and 190° C. as described in British Patent No. 757,309, corresponding to United States application Serial Number 350,663, filed April 23, 1953. The products resulting from this process have a concentration of oxyethylene groups away from, and of oxypropylene groups towards the free ends of the chains.

Further suitable polyoxyalkylene compounds for use in the present invention may be produced by reacting an hydroxy compound containing oxypropylene groups with ethylene oxide as described in British Patent No. 736,991, corresponding to United States application Serial Number 279,768, filed April 1, 1952, or by reacting an hydroxy compound in which oxyethylene groups are present with propylene oxide, as described in British Patent No. 757,309. These two processes are continuous processes, but products of similar composition may be prepared from the same reactants by the known batch processes. Polyoxypropylene diols, or their mono-alkyl or mono-aryl ethers may also be used in the invention. The polyoxypropylene diols have been widely described and are either availably commercially or may be prepared by standard methods.

Mixtures of any of the polyoxyalkylene compounds referred to above as suitable for use in the invention, with one another or with the vinyl or alkyl ethers produced during the course of their manufacture may also be used as heat-sensitising agents in the invention.

Following are examples illustrative of the invention, preceded by details of the various heat-sensitisers used therein.

All parts and percentages given below are by weight.

Definitions of various terms and abbreviations used in describing the heat-sensitisers and in the examples are as follows:

H. S.: An abbreviation for "heat-sensitiser."
Z. D. C.: An abbreviation for "zinc diethyldithiocarbamate," a vulcanisation accelerator.
Oxypropylene Content: The weight percentage of oxypropylene groups in the H. S. Thus, if the formula of the H. S. is represented as $$R(OC_2H_4)_n(OC_3H_6)_mOH$$

the oxypropylene content will be $$(5800m)/(58m+44n+M)$$

Where M is the molecular weight of ROH.

Acetyl M. Wt.: The molecular weight determined by reaction with a mixture of acetic anhydride and pyridine.
Calculated M. Wt.: The molecular weight calculated from the materials reacted.
Viscosity Index: The viscosity index as determined by method IP–73/47 described in the book "Standard Methods for Testing Petroleum and Its Products" published in 1949 by the Institute of Petroleum, London.
Pour Point: The pour point as determined by method IP–15/42 in the book referred to above.
Bromine No.: The weight in grams of bromine absorbed per 100 grams of product as determined by the Francis method.

H. S. 1, H. S. 2, H. S. 4, and H. S. 6 were produced by the process described in British Patent No. 757,309.

In the production of H. S. 1, a mixture of propylene oxide and ethylene oxide was reacted with a polyoxypropylene diol of molecular weight 370 to yield a product which was predominantly a polyoxyethyleneoxypropylene diol having the characteristics shown in the accompanying table.

In the production of H. S. 2, a mixture of propylene oxide and ethylene oxide was reacted with diethylene glycol to yield a product which was predominantly a polyoxyethyleneoxypropylene diol having the characteristics shown in the accompanying table.

In the production of H. S. 4, propylene oxide was reacted with the mono-methyl ether of ethylene glycol to yield a product which was predominantly the mono-methyl ether of a polyoxyethyleneoxypropylene diol, which ether had the characteristics shown in the accompanying table.

In the production of H. S. 6, propylene oxide was reacted with dipropylene glycol to yield a product which was predominantly a polyoxypropylene diol having the characteristics shown in the accompanying table.

H. S. 3 was produced by the acetylation of H. S. 2 with excess acetic anhydride followed by purification. It had a flocculation temperature of 33° C.

H. S. 7 was prepared in known manner from H. S. 6 by feeding ethylene oxide slowly into a stirred mass of H. S. 6 containing in solution a catalytic amount of caustic soda and maintained at a temperature of from 120–130° C. The product was predominantly a polyoxyethyleneoxypropylene diol having the characteristics shown in the accompanying table.

H. S. 9 was prepared by the process described in U. S. Patent No. 2,425,755. Butanol containing dissolved sodium metal was heated to its boiling point and a mixture of equal parts of ethylene oxide and propylene oxide was then fed slowly to the butanol. As the reaction proceeded the temperature was gradually raised to 130° C. The mixture of alkylene oxides was added as a liquid through a reflux condenser. The product was predominantly the monobutyl ether of a polyoxyethyleneoxypropylene diol, which ether had the characteristics shown in the accompanying table.

H. S. 10 was prepared in known manner by feeding propylene oxide slowly to a polyoxyethylene diol of average molecular weight 400 containing a catalytic amount of sodium metal in solution and maintained at a temperature of 120–130° C. The product was predominantly polyoxyethyleneoxypropylene diol having the characteristics shown in the accompanying table.

H. S. 5, and H. S. 8 were commercially available products. H. S. 5 was a polyoxypropylene diol of stated molecular weight 400 and having the characteristics shown in the accompanying table. H. S. 8 was predominantly the monoalkyl (believed to be butyl) ether of a polyoxyethyleneoxypropylene diol (Ucon lubricant 50–HB–260) which ether had the characteristics shown in the accompanying table.

The physical properties given in the accompanying table of heat sensitisers H. S. 1, 2, 4, 6, 7, 9, and 10 produced as described above, were determined after purification in the following manner.

The crude reaction product was heated to 100° C. at 20 mm. pressure to remove unreacted alkylene oxides. It was then dissolved in water and carbon dioxide was bubbled through the solution until it was neutral. The resulting aqueous solution was then heated to 90 to 95° C. and sodium sulphate added, if necessary, to assist separation of the mixture into an upper product layer and into a lower aqueous layer. The latter layer was removed and the product layer was washed twice with aqueous sodium sulphate at 90 to 95° C. and separated while hot from the aqueous phase. The product was then heated to 120 to 140° C. at 20 mm. pressure to remove traces of dissolved water and filtered while hot to remove inorganic salts which had been present in solution in the traces of water. The various refined products varied from water-white to pale yellow liquids.

The heat sensitisers H. S. 1, 2, 4, 6, 7, 9, and 10 produced as described above were found to give satisfactory results when used after purification as described in the preceding paragraph and also when the following treatment was substituted for this purification process.

The crude reaction product was heated to 100° C. at 20 mm. pressure to remove unreacted alkylene oxides. It was then dissolved in water and neutralized with sulphuric acid. The neutral aqueous solution usually containing 25 or 50% of heat sensitiser was used without further treatment in the following examples.

The heat sensitisers H. S. 5 and 8 were used in the form bought. Their physical characteristics were determined in this form.

TABLE

*Properties of heat sensitizers used in Example 1, 2 and 4 to 14*

|  | H. S. 1 | H. S. 2 | H. S. 4 | H. S. 5 | H. S. 6 | H. S. 7 | H. S. 8 | H. S. 9 | H. S. 10 |
|---|---|---|---|---|---|---|---|---|---|
| Calculated M. Wt | 1,700 | 1,200 | 450 |  | 940 | 1,030 |  | 700 | 1,100 |
| Acetyl M. Wt | 1,330 | 900 | 390 | 370 | 720 | 1,000 | 980 | 550 | 898 |
| Oxypropylene content, percent | 59 | 82 | 85 | 96 | 98 | 71 | 46 | 45 | 64 |
| Flocculation Temperature, °C | 49 | 40 | 40 | 58 | 28 | 36 | 54 | 52 | 51.5 |
| Density at 20° C., g./ml | 1.040 | 1.024 | 1.004 | 1.01 | 0.997 | 1.029 | 1.035 | 1.031 | 1.048 |
| Bromine No., g./100 g | 1.9 |  | 1.5 |  | 5.7 | 0.7 | 0.7 | 0.9 | 2.4 |
| Refractive Index, $n_D^{20}$ | 1.456 | 1.453 | 1.443 |  | 1.448 |  | 1.456 | 1.452 | 1.457 |
| Viscosity at 100° F, centistokes | 112 | 76.5 | 16.1 | 32.6 | 47.7 | 110 | 56.2 | 32.6 | 115 |
| Viscosity at 210° F., centistokes | 17.2 | 11.3 | 3.40 | 4.44 | 7.3 | 13.9 | 11.3 | 6.63 | 17.9 |
| Viscosity Index | 139 | 132 | 89 | 2 | 121 | 124 | 154 | 153 | 139 |
| Pour Point, °F | −45 |  | −60 | −40 | −45 | +85 (Melting Point) | −40 | −60 | +5 |
| Solubility in water at 20° C., g./100 ml. | Infinite | Infinite | Infinite | Infinite | 130 | Infinite | Infinite | Infinite | Infinite |

EXAMPLE 1

Ammonia-preserved, natural rubber latex (pH 10.5) of 60% dry rubber content was compounded with the following ingredients in the proportions stated:

| | Parts |
|---|---|
| Natural rubber latex (60% rubber) | 166 |
| Sulphur | 1.5 |
| Zinc oxide | 2.5 |
| Z. D. C. | 0.5 |
| H. S. 1 | 2.5 |

The sulphur, zinc oxide and Z. D. C. were added as a 50% dispersion in water, and the heat-sensitising agent H. S. 1 as a 25% solution in water.

A cylindrical aluminium former of 1 inch diameter was heated in an oven to 80° C. and then immersed in the above latex composition for 10 seconds with gentle stirring of the latex, whereby a smooth film of firmly gelled latex was deposited on the former. The deposit was dried at 40° C. and then vulcanised by heating in an oven at 100° C. for half an hour. The rubber film so prepared had a uniform thickness of 0.022 inch. In an otherwise identical test in which H. S. 1 was omitted from the latex compound, no film of gelled latex was deposited on the former. The heat-sensitised latex composition described above, after being stored in a closed vessel at 30° C. for three weeks, showed no signs of gelation or coagulation.

EXAMPLE 2

The following latex composition was prepared using ammonia-preserved, natural rubber latex (pH 10.5) containing 60% rubber by weight:

| | Parts |
|---|---|
| Natural rubber latex (60% rubber) | 166 |
| Sulphur | 1.5 |
| Zinc oxide | 2.5 |
| Z. D. C. | 0.5 |
| H. S. 2 | 5.0 |

The above ingredients were compounded as in Example 1. A cylindrical former of 1 inch diameter heated to 98° C. was immersed in the latex compound for 15 seconds and the deposit so formed was dried and vulcanised as described in Example 1. The resulting rubber film had a uniform thickness of 0.048 inch and could be stripped easily from the former.

EXAMPLE 3

A latex composition was prepared as in Example 2 with 5 parts of H. S. 3 in place of the 5 parts of H. S. 2. The resulting latex composition yielded upon an aluminium former of 1 inch diameter treated as described in Example 2, a rubber film having a uniform thickness of 0.054 inch which could be stripped easily from the former.

EXAMPLE 4

The following ingredients were added to 166 parts of a commercial, prevulcanised latex (pH 10.2) of natural rubber marketed by Revertex Limited under the trade name "Revultex" and containing 60% rubber.

| | Parts |
|---|---|
| Zinc oxide | 2.0 |
| H. S. 1 | 2.5 |

The zinc oxide was added to the latex as a 50% dispersion in water and the heat-sensitising agent as a 25% solution in water. A cylindrical aluminium former of 1 inch diameter was heated to 98° C. and immersed in the above latex compound for 10 seconds. The deposit so obtained was dried at 40° C. The resulting rubber film had a uniform thickness of 0.023 inch and could be stripped easily from the former.

EXAMPLE 5

The following ingredients were formed into a latex composition using the natural rubber latex referred to in Example 2:

| | Parts |
|---|---|
| Natural rubber latex (60% rubber) | 166 |
| Lissapol N | 1 |
| H. S. 1 | 2.5 |
| Zinc oxide | 2.5 |
| Sulphur | 1.5 |
| Z. D. C. | 0.5 |

Lissapol N, which was employed in the above composition as a foaming agent, is a commercial surface active agent marketed by Imperial Chemical Industries Limited and is believed to be an aqueous solution of a monoalkaryl ether of a polyethylene glycol.

The rubber latex, Lissapol N and H. S. 1 (as a 20% aqueous solution) were first whipped into a foam of volume approximately 6 times their normal volume by means of a wire cage beater, after which the zinc oxide, sulphur and Z. D. C. were added together as a 50% dispersion in water with continued whipping of the latex mix. The foam so formed was poured into cylindrical moulds 2½ inches in diameter and 2 inches deep. The moulds were then heated in an air oven at 100° C. for 40 minutes, thereby effecting gelation and vulcanisation of the compound. The resulting product was then removed from the mould, washed in running cold water for 2 hours and finally dried in an air oven at 40° C. The sponge so produced was cut open and was found to have a fine, uniform pore structure.

EXAMPLE 6

Ammonia-preserved, natural rubber latex was mixed with a butadiene styrene copolymer in latex form. The copolymer latex was produced by the copolymerisation of butadiene and styrene in the ratio 1:1. The resulting latex mixture contained 30 parts of synthetic copolymer fo reach 70 parts of natural rubber on a dry weight basis and was compounded as follows:

| | Parts |
|---|---|
| Natural rubber latex (60% rubber) | 116 |
| Butadiene styrene copolymer latex (40% copolymer) | 75 |
| Sulphur | 1.5 |
| Zinc oxide | 2.5 |
| Z. D. C | 0.75 |
| H. S. 1 | 2.5 |

The above ingredients were mixed as described in Example 1. A cylindrical aluminium former of 1 inch diameter heated to 90° C. was immersed in the latex compound for 10 seconds and the resulting deposit was dried at 35° C. Vulcanisation was effected by heating for 60 minutes at 100° C. The deposit formed was found to be 0.032 inch thick.

EXAMPLE 7

The following ingredients were formed into a latex composition using the natural rubber latex referred to in Example 2:

| | Parts |
|---|---|
| Natural rubber latex (60% rubber) | 166 |
| Sulphur | 1.5 |
| Zinc oxide | 2.5 |
| Z. D. C | 0.5 |
| H. S. 4 | 3.0 |

The above ingredients were compounded as in Example 1. A cylindrical aluminium former of 1 inch diameter heated to 98° C. was immersed in the latex compound for 10 seconds and the deposit was then dried and vulcanised as in Example 1. The resulting rubber film had a uniform thickness of 0.030 inch.

EXAMPLE 8

A latex composition was prepared as in Example 1, with 2.5 parts of H. S. 5 in place of the 2.5 parts of H. S. 1.

The resulting latex composition yielded upon an aluminium former of 1 inch diameter treated as described in Example 1, a rubber film having a uniform thickness of 0.020 inch which would be stripped easily from the former.

EXAMPLE 9

A latex composition was prepared as in Example 1, with 2.5 parts of H. S. 6 in place of the 2.5 parts of H. S. 1.

The resulting latex composition yielded upon an aluminium former of 1 inch diameter treated as described in Example 1, a rubber film having a uniform thickness of 0.025 inch which could be stripped easily from the former.

EXAMPLE 10

A latex composition was prepared as in Example 1, with 2.5 parts of H. S. 7 in place of the 2.5 parts of H. S. 1.

The resulting latex composition yielded upon an aluminium former of 1 inch diameter treated as described in Example 1, a rubber film having a uniform thickness of 0.023 inch which could be stripped easily from the former.

A product similar in physical characteristics and heat-sensitising properties to H. S. 7 was also made by reacting ethylene oxide continuously with H. S. 6 by a process as described in British Patent No. 736,991.

EXAMPLE 11

A latex composition was prepared as in Example 1, with 2.5 parts of H. S. 8 in place of the 2.5 parts of H. S. 1.

The resulting latex composition yielded upon an aluminium former of 1 inch diameter treated as described in Example 1, a rubber film having a uniform thickness of 0.020 inch which could be stripped easily from the former.

EXAMPLE 12

A latex composition was prepared as in Example 1, with 2.5 parts of H. S. 9 in place of the 2.5 parts of H. S. 1.

The resulting latex composition yielded upon an aluminium former of 1 inch diameter treated as described in Example 1, a rubber film having a uniform thickness of 0.020 inch which could be stripped easily from the former.

EXAMPLE 13

A latex composition was prepared as in Example 1, with 2.5 parts of H. S. 10 in place of the 2.5 parts of H. S. 1.

The resulting latex composition yielded upon an aluminium former of 1 inch diameter treated as described in Example 1, a rubber film having a uniform thickness of 0.023 inch which could be stripped easily from the former.

A product similar in physical characteristics and heat-sensitising properties to H. S. 10 was also made by reacting propylene oxide continuously with polyoxyethylene diol of average molecular weight 600 by a process as described in British Patent No. 757,309.

EXAMPLE 14

The following ingredients were formed into a latex composition using the natural rubber latex referred to in Example 2:

| | Parts |
|---|---|
| Natural rubber latex (60% rubber) | 166 |
| Ammonium ricionleate | 0.25 |
| H. S. 7 | 1.5 |
| Zinc oxide | 1.5 |
| Sulphur | 1.5 |
| Z. D. C | 1.5 |

The foaming agent, ammonium ricinoleate, was added in the form of a 25% solution in water and the heat-sensitiser H. S. 7 was added as a 20% solution in water. The rubber latex, foaming agent and heat-sensitiser were first whipped together into a foam of a volume approximately six times their normal volume using a wire cage beater, after which the zinc oxide, sulphur and Z. D. C. were added together as a 50% dispersion in water, with continued whipping of the latex mix. The foam was then converted into sponge rubber articles in the manner described in Example 5. The resulting products had a fine and uniform pore structure.

EXAMPLE 15

The following ingredients were formed into a latex composition using the natural rubber latex referred to in Example 2.

| | Parts |
|---|---|
| Natural rubber latex (60% rubber) | 166 |
| Ammonium ricinoleate | 0.25 |
| H. S. 6 | 2.0 |
| Zinc oxide | 1.5 |
| Sulphur | 1.5 |
| Z. D. C | 1.5 |

The foaming agent (ammonium ricinoleate) and the heat-sensitiser were added to the latex as 25% solutions in water. The mixture was whipped into a foam approximately four times the original volume and the sulphur, zinc oxide and Z. D. C. then added as a 50% dispersion in water with continued whipping. The foamed mixture was then converted into sponge rubber articles as described in Example 5. The resulting products had a fine and uniform pore structure with a bulk density approximately 0.18 gm./cc.

EXAMPLE 16

The following ingredients were formed into a latex composition for the preparation of sponge rubber articles of bulk density approximately 0.08 gm./cc.

| | Parts |
|---|---|
| Natural rubber latex (60% rubber) | 166 |
| H. S. 6 | 8 |
| Zinc oxide | 1.5 |
| Sulphur | 1.5 |
| Z. D. C | 1.5 |

The latex and heat sensitiser (the latter as a 25% aqueous solution) were mixed together and whipped into a foam of approximately nine times the original volume of latex. The vulcanising ingredients were then added together as a 50% dispersion in water, with further whipping. Moulding, vulcanisation and drying were carried out as described in Example 5. The resulting sponge articles were found to have a fine even pore structure and bulk densities of approximately 0.08 gm./cc.

EXAMPLE 17

The following ingredients were formed into a latex composition using the natural rubber latex referred to in Example 2.

| | Parts |
|---|---|
| Natural rubber latex (60% rubber) | 166 |
| H. S. 6 | 2.5 |
| Cetyl alcohol condensed with 17 mols ethylene oxide | 0.7 |
| Hydrochloric acid 5% aqueous solution by weight | 33 |
| Zinc oxide | 1.0 |
| Sulphur | 1.0 |
| Z. D. C | 1.0 |

In this example the polyoxypropylene diol and the cetyl alcohol/ethylene oxide condensate were added to the latex together as a 25% aqueous solution. The aqueous hydrochloric acid was then added with stirring whereby the pH of the latex bath was reduced to 7.0±0.2. The vulcanising ingredients were then added. On dipping a heated aluminium former at 70° C. into this bath a firmly gelled deposit of rubber was produced which was dried and vulcanised as described in Example 1 and was then easily stripped from the former.

We claim:

1. A rubber latex composition containing as a heat-sensitizing agent a polyoxyalkylene compound which has an average molecular weight of between 350 and 5000, is soluble to the extent of at least 5% in water at 20° C., and is of the general formula $$R(OCH_2CH_2)_x(OC_2H_3(CH_3))_yOH$$

where R is selected from the group consisting of H and alkyl and alkenyl radicals containing not more than 4 carbon atoms, $x$ is selected from the group consisting of zero and an integer and $y$ is an integer of at least 4.

2. A rubber latex composition as claimed in claim 1, in which the rubber latex is a natural rubber latex of pH from about 9.5 to about 10.5 and the composition contains zinc oxide.

3. A rubber latex composition as claimed in claim 1, in which the rubber latex is a mixture of natural rubber latex and a lesser amount of synthetic rubber latex obtained by emulsion copolymerization of butadiene and styrene.

4. A rubber latex composition as claimed in claim 2, in which said polyoxyalkylene compound is a polyoxyethyleneoxypropylene diol which has an average molecular weight between 900 and 2000, has an oxypropylene content of from 50 to 80% by weight and is soluble to the extent of at least 20% by weight in water at 20° C.

5. A rubber latex composition as claimed in claim 2, in which said polyoxyalkylene compound is a polyoxypropylene diol which has an average molecular weight between 400 and 1000.

6. A rubber latex composition as claimed in claim 2, in which said polyoxyalkylene compound is a monoether of a polyoxyethyleneoxypropylene diol which has an average molecular weight between 500 and 2000, an oxypropylene content of from 40 to 80% by weight and is soluble to the extent of at least 20% by weight in water at 20° C.

7. In the manufacture of rubber articles by the shaping and the gelling by heating of a prevulcanized rubber latex composition, the step which comprises rendering the composition heat sensitive prior to gelling by the addition thereto of a polyoxyalkylene compound which has a molecular weight between 400 and 2000, is soluble in water at 20° C. to the extent of at least 20% by weight, and is of the general formula $$R(OCH_2CH_2)_x(OC_2H_3(CH_3))_yOH$$

where R is selected from the group consisting of H and alkyl and alkenyl radicals containing not more than 4 carbon atoms, $y$ is an integer of at least 4, and $x$ is an integer.

8. In the manufacture of rubber articles by shaping a natural rubber latex composition containing a plurality of vulcanizing ingredients including sulfur, a rubber vulcanization accelerator and zinc oxide followed by gelling by heating of the composition and vulcanizing the gel so formed, the step which comprises rendering the composition heat sensitive prior to gelling by the addition thereto of a polyoxyalkylene compound which has a molecular weight between 400 and 2000, is soluble in water at 20° C. to the extent of at least 20% by weight, and is of the general formula $$R(OCH_2CH_2)_x(OC_2H_3(CH_3))_yOH$$

where R is selected from the group consisting of H and alkyl and alkenyl radicals containing not more than 4 carbon atoms, $y$ is an integer of at least 4, and $x$ is an integer.

9. A process for the manufacture of sponge rubber articles which comprises preparing a compounded natural rubber latex foam having a pH value of about 10 and containing a plurality of vulcanizing ingredients including sulfur, a rubber vulcanization accelerator and zinc oxide and, as a heat-sensitizing agent, a polyoxypropylene diol of molecular weight between 400 and 900 and soluble in water at 25° C. to the extent of at least 5% by weight, shaping the foam, heating the shaped foam to a temperature not less than that at which the said diol becomes less than 5% soluble by weight in water and vulcanizing the gel thus formed.

References Cited in the file of this patent

UNITED STATES PATENTS

| 2,215,562 | Ogilby | Sept. 24, 1940 |
| 2,442,341 | Buffington | June 1, 1948 |
| 2,534,375 | Rumbold | Dec. 19, 1950 |
| 2,587,279 | Bevilacqua | Feb. 26, 1952 |
| 2,598,127 | Keckler | May 27, 1952 |

FOREIGN PATENTS

| 470,181 | Great Britain | Dec. 31, 1936 |
| 624,917 | Great Britain | June 17, 1949 |